(12) United States Patent
Riley

(10) Patent No.: US 10,547,512 B2
(45) Date of Patent: Jan. 28, 2020

(54) FILTERED DISCOVERY OF DEVICES ON A NETWORK

(71) Applicant: Echelon Corporation, Santa Clara, CA (US)

(72) Inventor: Glen M. Riley, Saratoga, CA (US)

(73) Assignee: Echelon Corporation, Santa Clara, CA (US)

( * ) Notice: Subject to any disclaimer, the term of this patent is extended or adjusted under 35 U.S.C. 154(b) by 418 days.

(21) Appl. No.: 15/399,038

(22) Filed: Jan. 5, 2017

(65) Prior Publication Data

US 2018/0191576 A1 Jul. 5, 2018

(51) Int. Cl.
 *H04L 12/24* (2006.01)
 *G06F 7/58* (2006.01)
 *H04L 29/08* (2006.01)

(52) U.S. Cl.
 CPC .............. *H04L 41/12* (2013.01); *G06F 7/588* (2013.01); *H04L 67/12* (2013.01); *H04L 67/16* (2013.01)

(58) Field of Classification Search
 CPC ..... H04L 41/0806; H04L 41/12; H04L 45/02; H04L 67/16; H04L 67/12; H04W 40/246; H04W 84/18; H04W 8/005; H04W 92/18; G06F 7/588
 See application file for complete search history.

(56) References Cited

U.S. PATENT DOCUMENTS

| 6,980,521 | B1 * | 12/2005 | Jarvis | H04L 45/00 370/238 |
|---|---|---|---|---|
| 8,290,710 | B2 | 10/2012 | Cleland et al. | |
| 8,732,031 | B2 | 5/2014 | Martin et al. | |
| 8,829,821 | B2 | 9/2014 | Chobet et al. | |

(Continued)

FOREIGN PATENT DOCUMENTS

| EP | 2503853 | 9/2012 |
|---|---|---|
| EP | 2592908 | 8/2014 |

(Continued)

OTHER PUBLICATIONS

Rajput, K. Y., et al. "Intelligent street lighting system using gsm." International Journal of Engineering Science Invention 2.3 (2013): 60-69.

(Continued)

*Primary Examiner* — David R Lazaro
(74) *Attorney, Agent, or Firm* — Locke Lord LLP

(57) ABSTRACT

A system manages the quantity of responses by discoverable lighting devices in a network, in responding to a device discovery request from a lighting control server. Each device includes a random target number accessible via the network, comprising a plurality of sequentially arranged fields, each field including a random target integer selected from a range of integers, based on a position of the field in the sequentially arranged fields of the random target number. The device discovery message includes a request to respond to the message if a specified value in the message compares (Continued)

with a target integer in a specified field of the random target number included in the receiving discoverable device, the specified value and specified field in the request based on an estimated percentage of the devices in the network expected to respond. Each device generates a response to the received request, if there is a successful comparison.

20 Claims, 12 Drawing Sheets

(56) References Cited

U.S. PATENT DOCUMENTS

| | | | |
|---|---|---|---|
| 2003/0177174 A1* | 9/2003 | Allen | G06F 3/06 |
| | | | 709/203 |
| 2004/0073620 A1* | 4/2004 | Roh | H04L 41/18 |
| | | | 709/208 |
| 2009/0094599 A1* | 4/2009 | Larcombe | H04L 41/022 |
| | | | 717/177 |
| 2009/0278479 A1 | 11/2009 | Platner et al. | |
| 2010/0293379 A1* | 11/2010 | Nie | H04L 9/0891 |
| | | | 713/169 |
| 2012/0098445 A1 | 4/2012 | Park et al. | |
| 2013/0116003 A1 | 5/2013 | Chhatbar et al. | |
| 2013/0234862 A1 | 9/2013 | Toth et al. | |
| 2013/0268654 A1 | 10/2013 | Abraham et al. | |
| 2015/0250042 A1 | 9/2015 | Aggarwal et al. | |
| 2016/0037325 A1 | 2/2016 | Bucci | |
| 2016/0094399 A1 | 3/2016 | Kish | |
| 2016/0218804 A1 | 7/2016 | Raj et al. | |
| 2016/0286629 A1 | 9/2016 | Chen et al. | |

FOREIGN PATENT DOCUMENTS

| | | |
|---|---|---|
| WO | WO 2014147524 | 9/2014 |
| WO | WO 2015077630 | 5/2015 |
| WO | WO2016048428 | 3/2016 |

OTHER PUBLICATIONS

Kaleem, Zeeshan, Ishtiaq Ahmad, and Chankil Lee. "Smart and energy efficient led street light control system using ZigBee network." Frontiers of Information Technology (FIT), 2014 12th International Conference on. IEEE, 2014.

Natu, Omkar, and S. A. Chavan. "GSM based smart street light monitoring and control system." International Journal on Computer Science and Engineering 5.3 (2013): 187.

Subramanyam, B. K., K. Bhaskar Reddy, and P. Ajay Kumar Reddy. "Design and development of intelligent wireless street light control and monitoring system along with gui." International Journal of Engineering Research and Applications (IJERA) 3.4 (2013): 2115-2119.

International Search Report and Written Opinion for International Application No. PCT/US17/67538 dated Mar. 9, 2018.

* cited by examiner

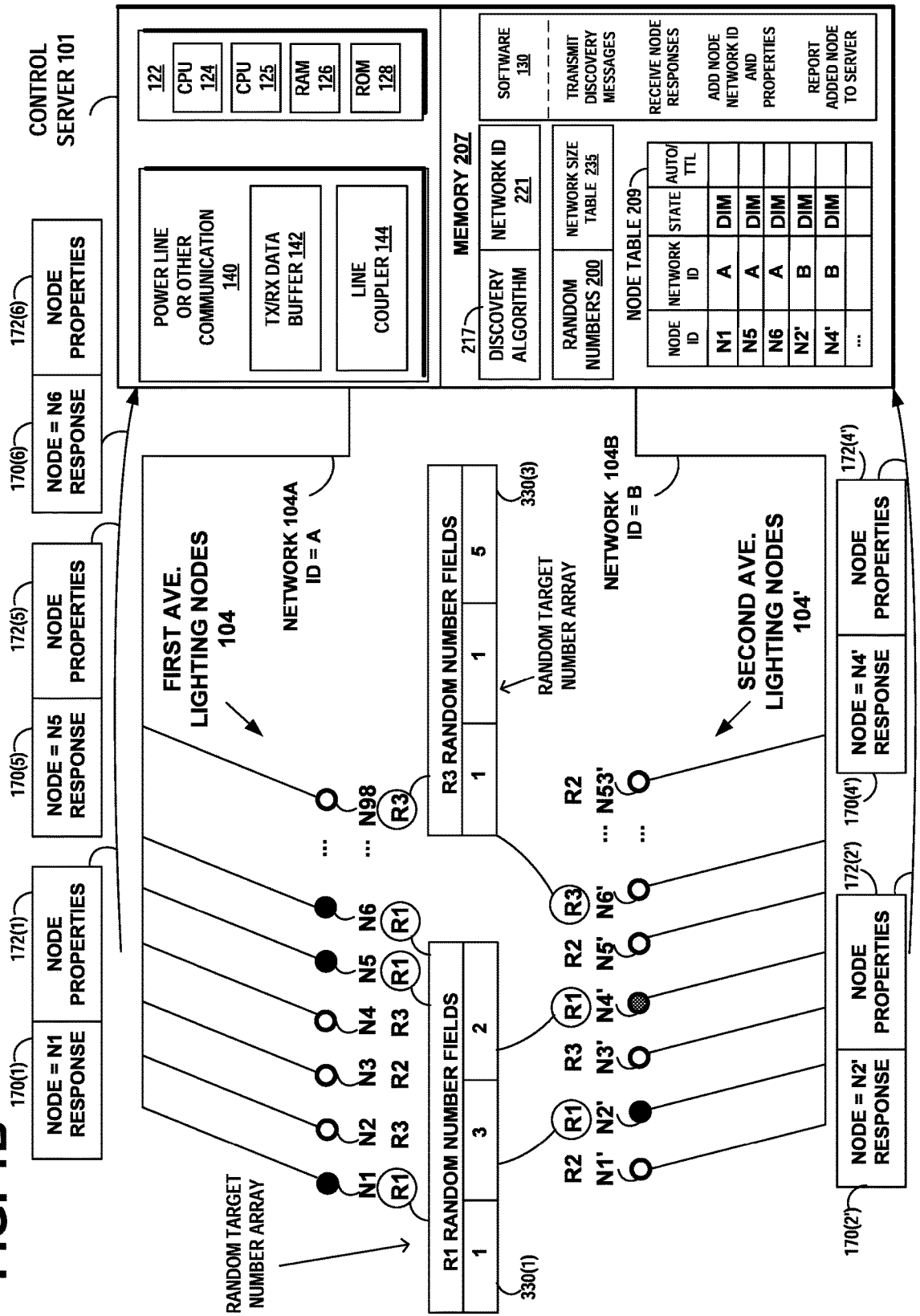

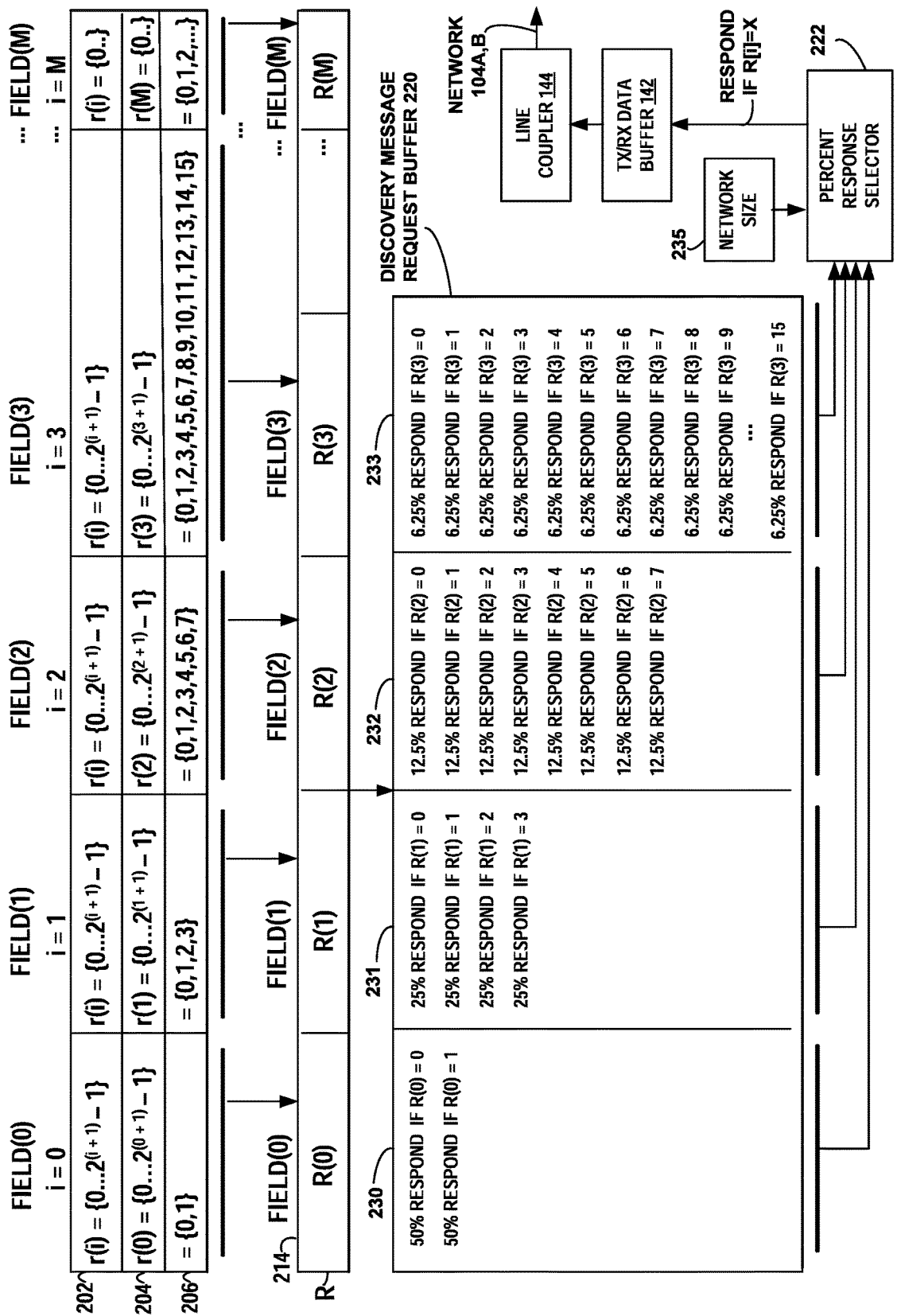

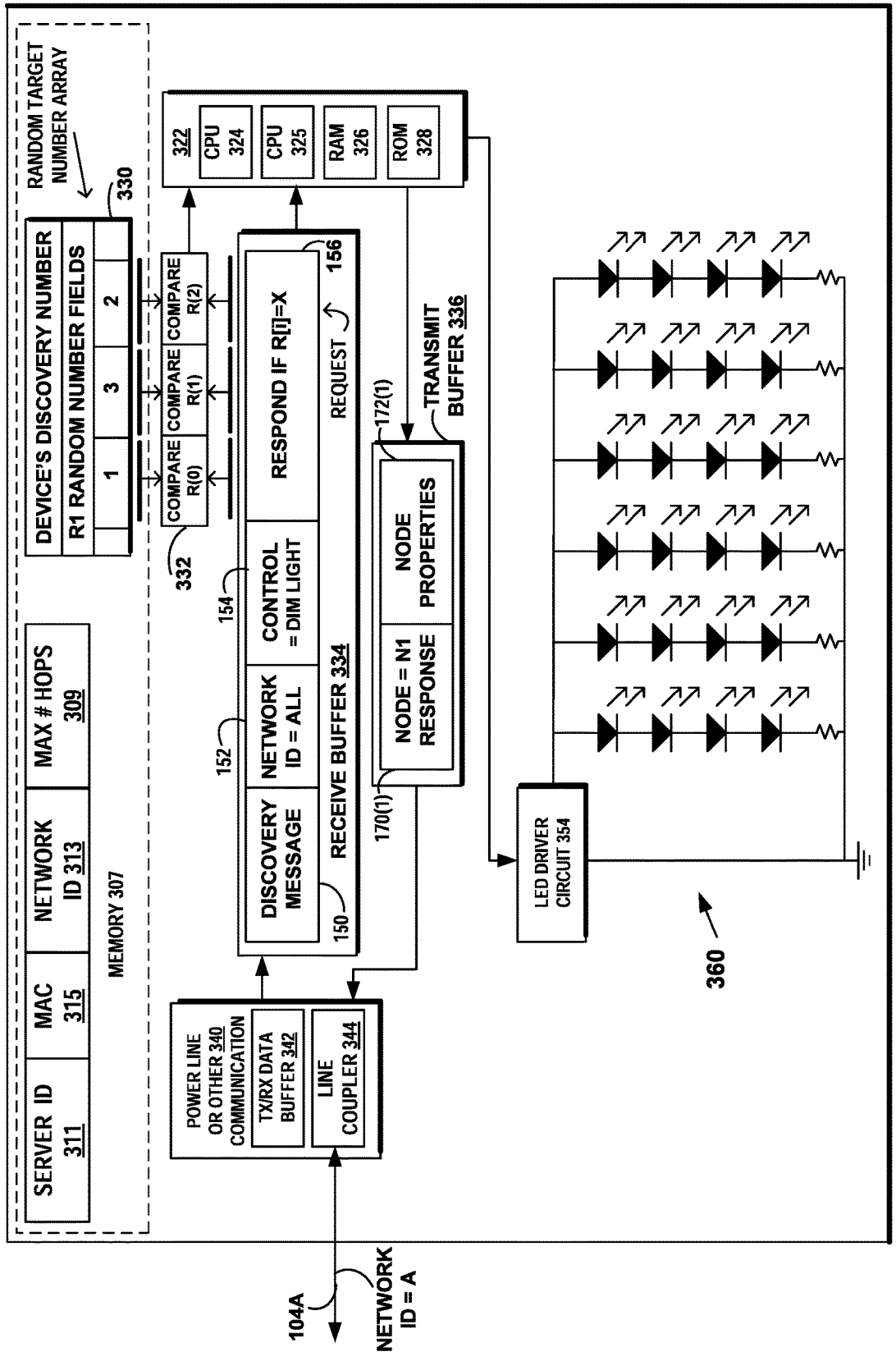

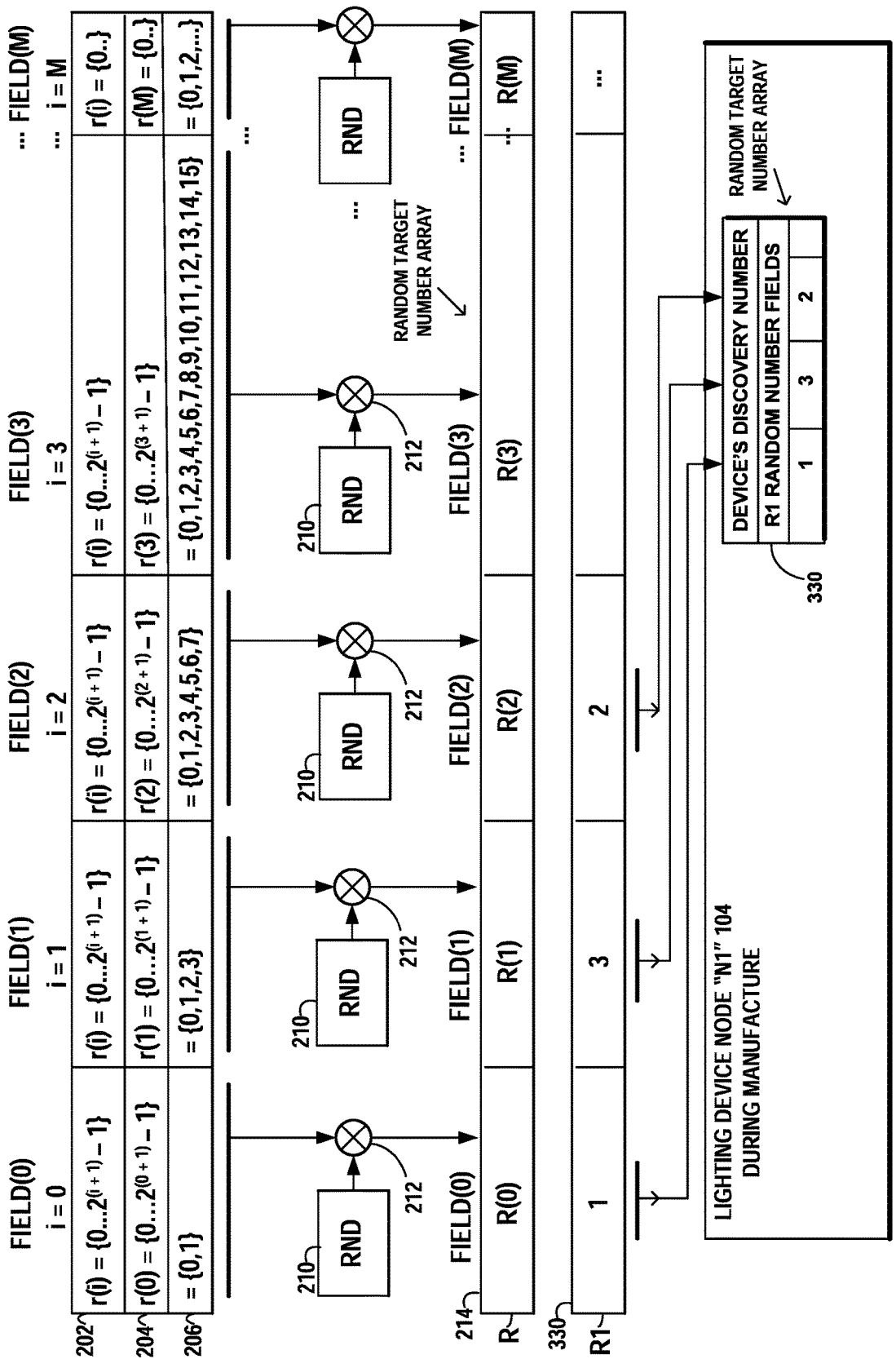

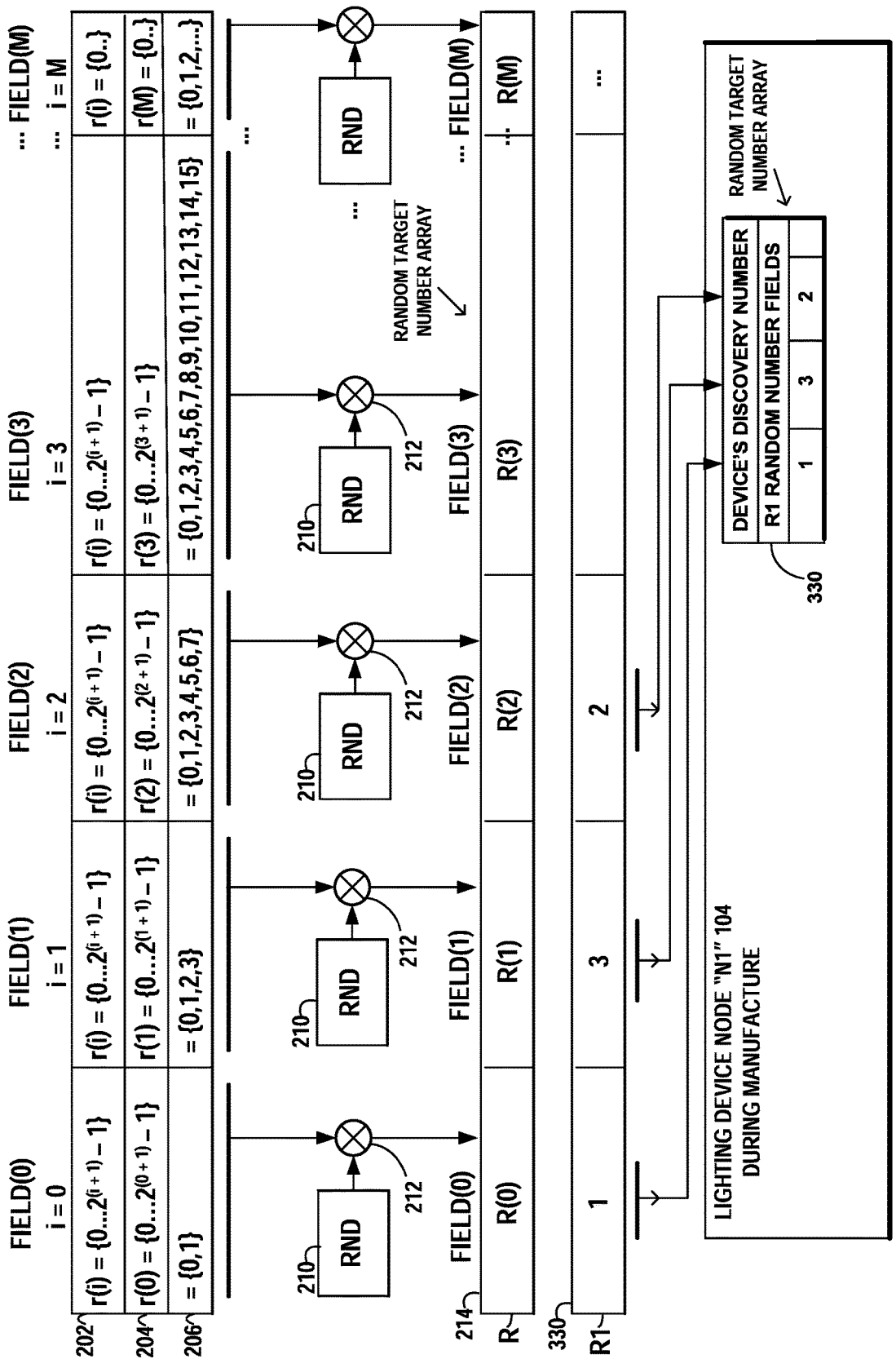

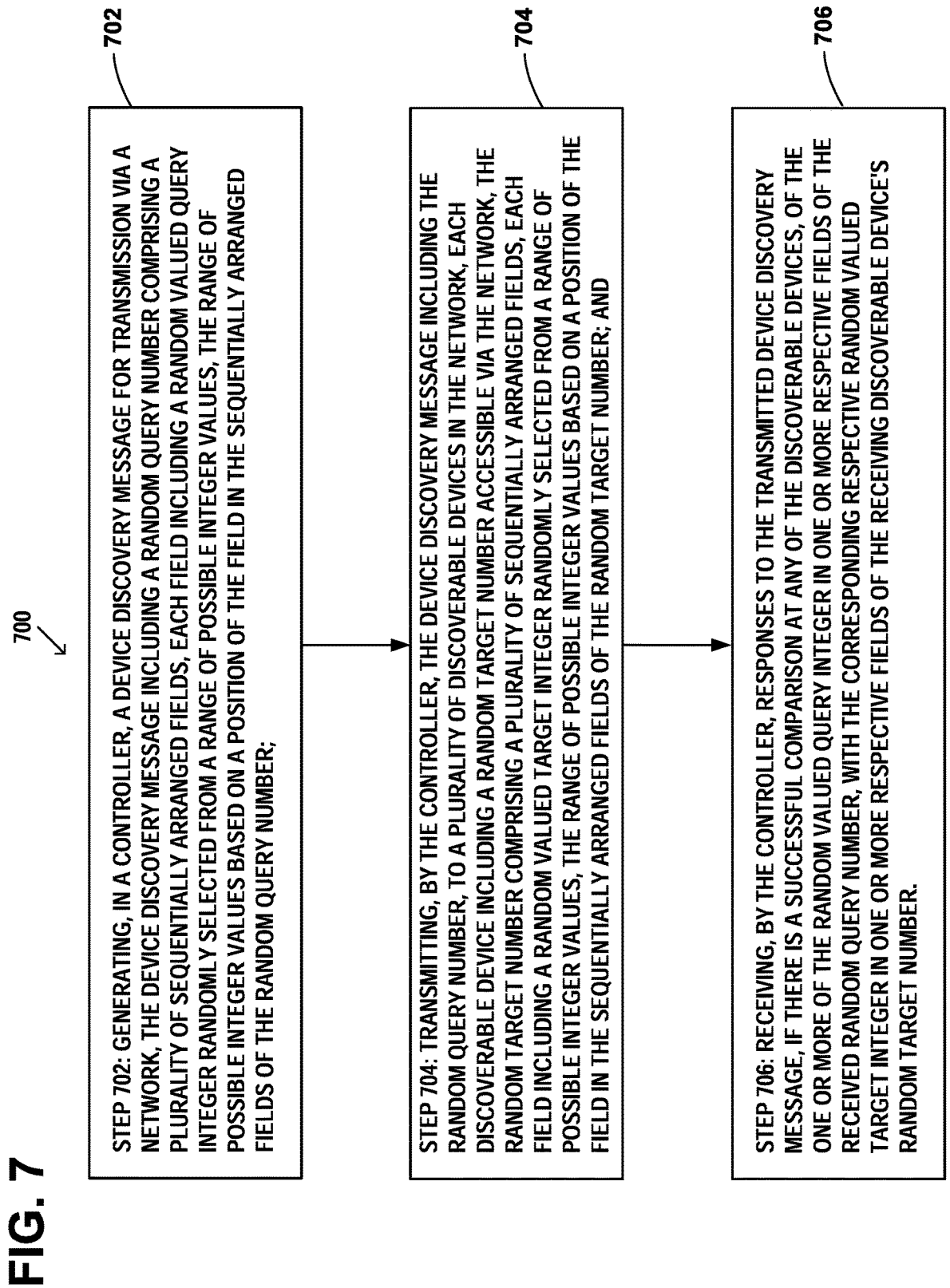

FILTERED DISCOVERY OF DEVICES ON A NETWORK

FIELD OF THE INVENTION

The invention disclosed broadly relates to networking and more particularly relates to efficient discovery of lighting devices in a network.

BACKGROUND OF THE INVENTION

Modern commercial outdoor lighting systems are required to do more than ever before. In addition to fulfilling their primary purpose of lighting dark roadways, parking areas, and public spaces, outdoor lighting systems are expanding and increasingly evaluated for how well they reduce energy consumption, improve safety for both pedestrians and drivers, and serve as a foundation for a range of Internet of Things (IoT) applications. Increasingly, lighting system environments, both indoor and outdoor, are networked sometimes together. As more and more objects join the network, they expose shortcomings in existing solutions deployed to connect lighting devices and other lighting equipment to a lighting controller. One significant problem is the discovery and control of new lighting device nodes as a network increases in size. Also, large collections of lighting device nodes give rise to a hidden node problem.

SUMMARY OF THE INVENTION

Example embodiments of the invention solve the problem of discovery and control of new lighting device nodes as a network increases in size.

In accordance with example embodiments of the invention, a system manages the quantity of responses by discoverable lighting devices in a network, in responding to a device discovery request from a lighting control server. Each device includes a random target number array accessible via the network, which comprises a linear array of a plurality of sequentially arranged fields. Each field includes a random target integer selected from a range of integers, based on a position of the field in the sequentially arranged fields of the random target number array. In an embodiment of the invention, the device discovery message includes a request that specifies an integer value in a specified field in the target array. A receiving discoverable device will respond to the message, if the specified integer value in the specified field in the message equals a target integer in the corresponding field of the target array in the receiving discoverable device. The specified value and specified field in the request is based on an estimated percentage of the plurality of discoverable devices in the network expected to respond. A discoverable device generates a response to the received request, if there is a successful comparison of the received request, with the device's random target number array.

In an alternate embodiment of the invention, the receiving discoverable device may to respond to the message, if the specified integer value in the specified field in the message is within plus or minus a tolerance range of values of the target integer in the corresponding field of the target array in the receiving discoverable device.

In an alternate embodiment of the invention, the estimated percentage of the devices expected to respond may be based on the size of the network, in terms of the total number of discoverable lighting devices in the network. If there is a large number of discoverable devices in the network, it may be advantageous to reduce or manage the number of responses to each device discovery message, in order to avoid network congestion. This reduction in the number of responses may be accomplished, in accordance with the invention, by specifying in the message a field in the target number array, which corresponds to an estimated percentage of the devices that will respond to the message based on the size of the network. Since the integer values are random in each field of the target number array, the percentage of responses is an estimate.

In an alternate embodiment of the invention, the device discovery message may include a query number array comprising a linear array of a plurality of sequentially arranged fields, each field including a random query integer selected from a range of integers, the range of integers based on a position of the field in the sequentially arranged fields of the query number array. In accordance with this alternate embodiment of the invention, the device discovery message may provide two or more fields of the query number array whose respective query integers are to be compared with corresponding target integers in the corresponding fields of the target array, based on an estimated percentage of the plurality of discoverable devices in the network expected to respond. The estimated percentage of the devices expected to respond may be based on the size of the network, in terms of the total number of discoverable lighting devices in the network. If there is a large number of discoverable devices in the network, a reduction may be accomplished in the number of expected responses to each device discovery message, by providing more fields of the discovery message to be compared with corresponding fields of the target arrays.

In accordance with example embodiments of the invention, the discoverable lighting devices may be fabricated with the random target number array either during manufacture or during installation in the network.

In accordance with example embodiments of the invention, device discovery may be conducted in at least two stages. In a first stage, responses are obtained from all of the discoverable lighting devices receiving the device discovery message. This may be followed by a second stage, wherein each discoverable lighting device receiving the device discovery message responds to the received device discovery message, if there is a successful comparison of the specified query integer value in the message with the target integer in the specified field of the random target number included in the receiving discoverable device. The receiving discoverable device may respond to the message, if the specified integer value in the specified field in the message is within plus or minus a tolerance range of values of the target integer in the corresponding field of the target array in the receiving discoverable device. The tolerance range of query integer values for comparison with the target integer may be based on a mathematical relationship to the network size or the desired percentage of response, or other factors.

In accordance with example embodiments of the invention, the network may be a power line communication network interconnecting the discoverable lighting devices, with the lighting control server. The power line communications network allows data communications over installed power lines to lights or other electrical devices where power is needed and control desired. The same power lines may be utilized to send control commands to lighting devices, signs, and other electrical devices. In an alternate embodiment, other examples of the network include twisted pair, coax cable, Ethernet, radio media such as WiFi, Bluetooth, cellular, IEEE 802.15.4 RF at longer distances, and LoRa Low Power Wide Area Network.

In accordance with example embodiments of the invention, each field of the random target number array comprises a random valued target integer randomly selected from a generalized range r(i) of possible integer values, r(i)={x(i,0);x(i,1);x(i,2); . . . F(i)}, where x(i, 0) is the first occurring integer element in the set r(i) and F(i) sets a maximum limit on the quantity of integers that can be elements of the set r(i). The range r(i) of possible integer values is based on a position i of the field in the sequentially arranged fields of the random target number array.

In accordance with example embodiments of the invention, the specified value in the device discovery message is an integer selected from a generalized range r(i) of possible integer values $$r(i)=\{x(i,0);x(i,1);x(i,2); \ldots F(i)\},$$

where x(i,0) is the first occurring integer element in the set r(i) and F(i) sets a maximum limit on the quantity of integers that can be elements of the set r(i).

The generalized range r(i) of possible integer values is based on a position i of a field in a linear array of sequentially arranged fields. The estimated percentage of the plurality of discoverable devices in the network expected to respond is based on the specified field in the request.

In accordance with example embodiments of the invention, if $F(i)=2^{(i+1)}-1$, then each field of the random target number array comprises a random valued target integer randomly selected from a range r(i) of possible integer values, $r(i)=\{0 \ldots 2^{(i+1)}-1\}$, the range r(i) of possible integer values based on a position i of the field in the sequentially arranged fields of the random target number array.

In accordance with example embodiments of the invention, if $F(i)=2^{(i+1)}-1$,
then the specified value in the device discovery message is an integer selected from a range r(i) of possible integer values, $$r(i)=\{0 \ldots 2^{(i+1)}-1\}.$$

The range r(i) of possible integer values is based on a position i of a field in a linear array of sequentially arranged fields. The estimated percentage of the plurality of discoverable devices in the network expected to respond is based on the specified field in the request.

DESCRIPTION OF THE FIGURES

FIG. 1B illustrates the example embodiment of the invention in FIG. 1A, wherein the discoverable lighting devices in the network, receive the device discovery message including the request and to compare the specified value in the message with the target integer in the specified field of the random target number included in the receiving discoverable device. The discoverable devices generate a response to the received device discovery message, if there is a successful comparison of the specified value in the message with the target integer in the specified field of the random target number included in the receiving discoverable device.

FIG. 2 illustrates an example embodiment of the invention, showing the discovery algorithm in the control server, which generates a number array comprising a plurality of sequentially arranged fields, each field including an integer selected from a range of possible integer values, the range of possible integer values based on a position of the field in the sequentially arranged fields of the number array. An integer value and a field are selected to be specified in the request in the device discovery message. The selection of the field is based on an estimated percentage of the plurality of discoverable devices expected to respond in the network. The estimated percentage corresponds to the quantity of integers that are possible in each field. The control server then transmits the discovery message, including the request, to the network.

FIG. 3 illustrates an example embodiment of the invention, showing an example discoverable lighting device connected to the network. The discoverable lighting device includes the random target number array that is accessible via the network. The random target number array comprises a plurality of sequentially arranged fields, each field including a random valued target integer randomly selected from a range of possible integer values, the range of possible integer values based on a position of the field in the sequentially arranged fields of the random target number array.

FIG. 3A illustrates an example embodiment of the invention, showing an example of the fabrication of the discoverable lighting device, which includes writing the random target number array into the device, by means of the discovery algorithm of FIG. 2, applied to generate the random target number array.

FIG. 6B illustrates an example alternate embodiment of the invention, showing an example of the fabrication of the discoverable lighting device, which includes writing the random target number array into the device, by means of the discovery algorithm of FIG. 6A, applied to generate the random target number array. The random target number array comprises a plurality of sequentially arranged fields, each field including a random valued target integer randomly selected from a range of possible integer values, the range of possible integer values based on a position of the field in the sequentially arranged fields of the random target number array.

FIG. 7 illustrates an example flow diagram of steps performed by the control server in transmitting discovery messages in FIG. 6A, wherein the device discovery message includes a random query number array comprising a plurality of sequentially arranged fields.

DISCUSSION OF THE PREFERRED EMBODIMENTS

Example embodiments of the invention solve the problem of discovery and control of new lighting device nodes in a lighting network, as the network increases in size. In accordance with an example embodiment of the invention, the system manages the quantity of responses by discoverable lighting devices in the network, in responding to a device discovery request from a lighting control server.

Figure 1:
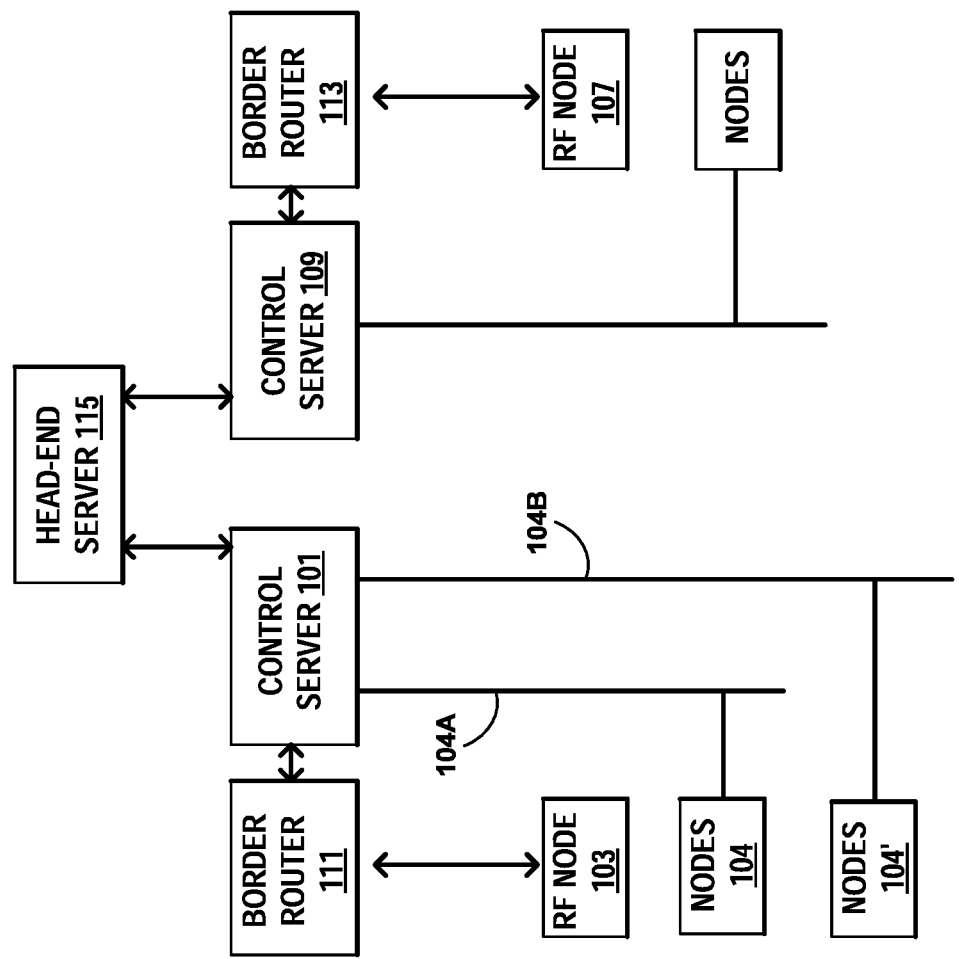
FIG. 1 illustrates an example prior art networked lighting control system including a head-end server that manages control servers that interface with routers and lighting networks having different protocols, such as power line communication networks or wireless communication networks.

FIG. 1 illustrates an example networked lighting control system including a head-end server 115 that manages control server 101 that interfaces with router 111 and lighting networks 104A and 104B having different protocols, such as power line communication networks or wireless communication networks. The head-end server may manage additional control servers, such as control server 109 that interfaces with router 113 and lighting networks having different protocols. The head-end server 115 may be used to design, install, or maintain networks, channels, routers, and lighting devices. For example, the head-end server 115 or the control server 101 may add nodes to a network. In some embodiments, the head-end server maintains a "blacklist" of nodes that are not allowed to join a network. In most deployments, the head-end server 115 and control server 101 control and communicate with coupled lighting nodes in the lighting networks.

One or more control servers 101, 109 in communication with the head-end server 115, may function as gateways to interface with border routers 111, 113. The control servers 101, 109 are capable of interfacing with networks that use different protocols. For example, they may receive and transmit power line communications with nodes such as nodes 104 or wireless communications with nodes 103, 107. In accordance with the invention, the control servers 101, 109 manage and control a plurality of lighting nodes 103, 104, 104', and 107.

To monitor and control a network of lighting devices, a lighting control server 101 will broadcast device discovery messages in the networks 104A, 104B. For networks having a large number of lighting devices, it may be advantageous to reduce or manage the number of responses to each device discovery message, in order to avoid network congestion. In accordance with the invention, each lighting device includes a random target number array accessible via the network, which is formed in the device at the time of its fabrication or installation. The target array comprises a linear array of a plurality of sequentially arranged fields. Each field includes a random target integer selected from a range of integers, based on the position of the field in the array. The range of possible values for the integer in a field increases for consecutive fields of the array. The fields are arranged so that the first occurring field has the least number of possible values for its integer, the second occurring field has more possible values for its integer than does the first field, and the third field has still more possible values for its integer than does the second field, and so on. The device discovery message includes a request or query to search for devices that have a particular integer value in a particular field of the target array. If more responses are desired for each message, the device discovery message will query for a particular integer in the first or second occurring target fields. If fewer responses are desired for each message, to reduce or manage congestion, the device discovery message will query for a particular integer in the third or higher occurring target fields.

In accordance with example embodiments of the invention, the possible integer values in the fields for both the lighting device's target array and for the device discovery message's request or query, are integers selected from a generalized range r(i) of possible integer values $$r(i)=\{x(i,0);x(i,1);x(i,2); \ldots F(i)\},$$

where $x(i,0)$ is the first occurring integer element in the set $r(i)$ and $F(i)$ sets a maximum limit on the quantity of integers that can be elements of the set $r(i)$.

The generalized range $r(i)$ of possible integer values is based on a position i of a field in a linear array of sequentially arranged fields. The estimated percentage of the plurality of discoverable devices in the network expected to respond is based on the specified field in the request. Fields with i=0 or i=1, for example would have a higher percentage of expected responses than would fields with i=2 or greater.

An example of the possible range of integer values in the fields for both the lighting device's target array and for the device discovery message's request or query, for $F(i)=i+1$, and $x(i,0)=0$ would be:

{0,1} in field(0),

{0,1,2} in field(1),

{0,1,2,3} in field(2),

{0,1,2,3,4} in field(3), and so on.

An example of the possible range of integer values in the fields for both the lighting device's target array and for the device discovery message's request or query, for $F(i)=2^{(i+1)}-1$, and $x(i,0)=0$ would be:

{0,1} in field(0),

{0,1,2,3} in field(1),

{0,1,2,3,4,5,6,7} in field(2),

{0,1,2,3,4,5,6,7,8,9,10,11,12,13,14,15} in field(3), and so on.

Figure 1A:
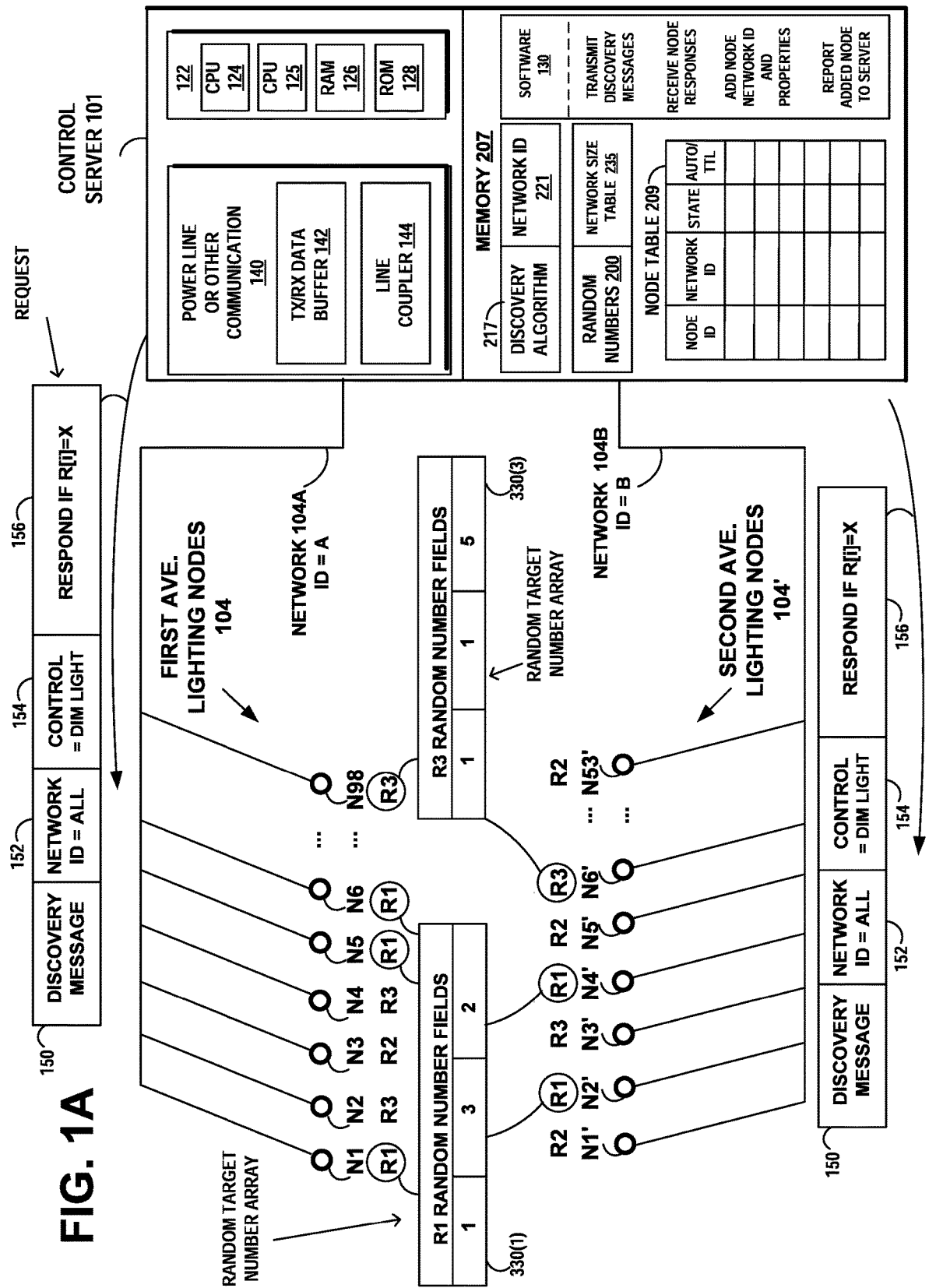
FIG. 1A illustrates an example embodiment of the invention, wherein a control server generates a device discovery message for transmission via the network. The device discovery message includes a request to a receiving discoverable device to respond to the message if a specified value in the message equals a target integer in a specified field of the random target number included in the receiving discoverable device. The specified value and specified field in the request are based on an estimated percentage of the plurality of discoverable devices expected to respond in the network.

FIG. 1A illustrates an example embodiment of the invention, wherein the control server 101 generates a device discovery message 150 for transmission via the network 104A and 104B. The device discovery message 150 includes a request 156 to discoverable devices, such as N1, to respond to the message if a specified integer value in a specified field indicated in the message 156 equals a target integer in a corresponding field of the random target number in the receiving discoverable device N1.

The specified integer value in the message 156 is an integer selected from a range r(i) of possible integer values, $$r(i) = \{0 \ldots 2^{(i+1)} - 1\}.$$

The range r(i) of possible integer values is based on a position i of a field in a linear array of sequentially arranged fields. The estimated percentage of the plurality of discoverable devices N1-N98 and N1'-N53' expected to respond in the network 104A, 104B, is based on the specified field in the request. Examples of the request 156 in the message 150 are shown in FIG. 2.

A plurality of discoverable lighting devices is in the networks 104A and 104B. Discoverable lighting devices N1, N2, N3, N4, N5, N6, . . . N98 (generally 104) are in network 104A. Discoverable lighting devices N1', N2', N3', N4', N5', N6', . . . N53' (generally 104') are in network 104B. Each discoverable device includes a random target number array "R" 214 (shown in FIG. 3A), whose value is written into memory 307 of the device at the time of its manufacture or at the time of its installation in the network. The random target number array "R" 214 in each device, is accessible via the network 104A or 104B. For example, in network 104A, the discoverable lighting device N1 includes a random target number array "R" 214 designated as "R1" 330(1), when values are assigned to the sequentially arranged fields R(0)=1, R(1)=3, and R(2)=2, as shown in FIG. 3A. In network 104B, the discoverable lighting device N6' includes a random target number array "R" 214 designated as "R3" 330(3), when values are assigned to the sequentially arranged fields R(0)=1, R(1)=1, and R(2)=5.

The control server 101 formats the discovery message 150 to include the request 156, a destination network ID 152, and optionally, a control field value 154. In the example shown in FIG. 1A, the destination network ID 152 is "ALL", making the discovery message broadcast to all connected networks 104A and 104B. In the example shown in FIG. 1A, control field value 154 is "DIM LIGHT", causing those discoverable lighting devices N1, N5, and N6 that have an integer value and field matching the request 156, to respond by dimming their light.

FIG. 1B illustrates the example embodiment of the invention in FIG. 1A, wherein the discoverable lighting devices N1, N2, N3, N4, N5, N6, . . . N98 in the network 104A, receive the device discovery message 150. The discoverable lighting devices N1', N2', N3', N4', N5', N6', . . . N53' in network 104B also receive the device discovery message 150. Each discoverable lighting device compares the specified integer value in the specified field indicated in the message 156 with the corresponding target integer in the corresponding field of the random target number array of each discoverable device, as shown in FIG. 3. The discoverable devices generate a response to the received device discovery message, if there is a successful comparison.

The discoverable devices N1, N5 and N6, have their target integer in the corresponding field of the random target number compare with the specified integer value in the specified field indicated in the message 156. The discoverable devices N1, N5 and N6 then generate responses to the received device discovery message 150, based on successful comparisons. For example, in the network 104A, the discoverable device N1 sends the response 170(1) including node properties 172(1) and the discoverable device N5 sends the response 170(5) including node properties 172(5). In the network 104B, the discoverable device N2' sends the response 170(2') including node properties 172(2') and the discoverable device N4' sends the response 170(4') including node properties 172(4').

Thus, it is seen that embodiments of the invention solve the problem of discovery and control of new lighting device nodes as the lighting network increases in size, by reducing the quantity of responses by discoverable lighting devices in the lighting network, in responding to the device discovery request from the lighting control server.

The control server 101 includes a processor 122 comprising a dual central processor unit (CPU) or multi-CPU 124/125, a random access memory (RAM) 126 and read only memory (ROM) 128. The memories 126 and/or 128 include computer program code, including control software 130. The control server 101 includes the discovery algorithm 217, network ID 221, random numbers 200, network size table 235, and node table 209. The node table 209 tracks the received node responses 170(1) and node properties 172(1) of the responding nodes, storing their node ID, network ID, and state of the lighting device nodes that have responded. Other properties of the responding lighting devices may also be tracked by the node table 209. The control server 101 includes a power line or other communications unit 140 that includes a transmit/receive (TX/RX) buffer 142 and a power line or other medium coupler 144, which is configured to communicate with the discoverable lighting devices 104 via the network 104A, which may be a power line operated as a communication link. Other examples of the network 104A, include twisted pair, coax cable, Ethernet, radio media such as WiFi, Bluetooth, cellular, IEEE 802.15.4 RF at longer distances, and LoRa Low Power Wide Area Network. In an alternate embodiment, the control server 101 may include a radio communications unit that includes a transmit/receive (TX/RX) buffer a cell phone transceiver and a WiFi transceiver to communicate with the discoverable lighting devices 104 via radio communications units in the devices.

FIG. 2 illustrates an example embodiment of the invention, showing the discovery algorithm 217 in the control server 101. The discovery algorithm 217 generates the number array "R" 214, comprising a plurality of sequentially arranged fields R(0), R(1), R(2), R(3) to R(M). Each field includes an integer "i" selected from a range of possible integer values. The range of possible integer values is based on the position of the field in the sequentially arranged fields of the number array "R" 214.

Each field of the number array "R" 214, comprises an integer selected from a range r(i) of possible integer values, $r(i) = \{0 \ldots 2^{(i+1)} - 1\}$, the range r(i) of possible integer values based on a position i of the field in the sequentially arranged fields of the number array "R" 214. FIG. 2 shows line 202 with the formula for the range r(i) in each of field(0), field(1), field(2), field(3), to field(M). FIG. 2 shows line 204 with the formula for the range r(i) having the field number substituted for "i" in each field, as r(0) in field(0), r(1) in field(1), r(2) in field(2), r(3) in field(0), to r(M) in field(M). FIG. 2 shows line 206 with the expression for the range r(i) in each field, as {0,1} in field(0), {0,1,2,3} in field(1), {0,1,2,3,4,5,6,7} in field(2), {0,1,2,3,4,5,6,7,8,9,10,11,12, 13,14,15} in field(3), and so on for field(M).

An integer value and a field are selected by the percent response selector 222, to be specified in the request 156 in the device discovery message 150. The selection of the field is based on an estimated percentage of the plurality of discoverable devices expected to respond in the network. In this example, the estimated percentage corresponds to the quantity of integers that are possible in each field.

The estimated percentage of the devices expected to respond may be based on the size of the network, in terms of the total number of discoverable lighting devices in the network. The network size table 235 stores the number of lighting devices in each network, which is input to the percent response selector 222. If there is a large number of discoverable devices in the network, it may be advantageous to reduce or manage the number of responses to each device discovery message, in order to avoid network congestion. This reduction in the number of responses may be accomplished, in accordance with the invention, by specifying in the message a field in the target number array, which corresponds to an estimated percentage of the devices that will respond to the message based on the size of the network. Since the integer values are random in each field of the target number array, the percentage of responses is an estimate.

The discovery message request buffer 220 is shown divided into four columns corresponding to the estimated percentage of the plurality of discoverable devices expected to respond in the network. In column 230 for the R(0) field, there are two possible integers and thus the estimated percentage of responses is 50%. In column 231 for the R(1) field, there are four possible integers and thus the estimated percentage of responses is 25%. In column 232 for the R(2) field, there are eight possible integers and thus the estimated percentage of responses is 12.5%. In column 233 for the R(3) field, there are sixteen possible integers and thus the estimated percentage of responses is 6.25%. For small networks, it may not be desired to minimize the number of responses to each discovery message, and thus the request may specify a lower field, for example field (1), for an expected percentage of 25% responses. For large networks, it may be desired to minimize the number of responses to each discovery message, and thus the request may specify a higher field, for example field (3), to reduce the expected percentage to 6.25% responses. The network size table 235 provides the number of lighting devices in the network, to the percent response selector 222. In response, the percent response selector 222 selects field (3) from the discovery message request buffer 220. The control server 101 then transmits the discovery message 150, including the request 156, to the network 104A, 104B. Variations of this algorithm would include different mathematical formulas to populate the fields, r(i) and therefore change the quantity of responses to the device discovery messages.

FIG. 3 illustrates an example embodiment of the invention, showing an example discoverable lighting device N1 (104) connected to the lighting network 104A. The discoverable lighting device N1 includes the random target number array R1 (330) that is accessible via the network 104A. The random target number array R1 (330) is written into the memory 307 of the lighting device N1 at the time of its manufacture, as is shown in FIG. 3A, by means of the discovery algorithm 217. In an alternate embodiment, the random target number array R1 (330) may be written into the memory 307 of the lighting device N1 during installation in the lighting network 104A.

The random target number array R1 (330) in the device N1 comprises a plurality of sequentially arranged fields R(0), R(1), and R(2) that have been assigned the values R(0)=1, R(1)=3, and R(2)=2, by the discovery algorithm 217, as shown in FIG. 3A.

The example discoverable lighting device N1 (104) shown in FIG. 3, includes a power line or other communications unit 340 that includes a transmit/receive (TX/RX) buffer 342 and a power line or other medium coupler 344, which is configured to communicate with the control server 101 via the network 104A, which may be a power line operated as a communication link. The discovery messages 150 received from the control server 101, are buffered in the receive buffer 334. The discoverable lighting device N1 compares with the comparator 332, the target integer in the corresponding field of the random target number 330 with the specified integer value in the specified field indicated in the message 156 in the receive buffer 334. The discoverable device N1 generates a response to the received device discovery message 150, if there is a successful comparison. The response 170(1) including node properties 172(1) to be sent to the control server 101, are buffered in the transmit buffer 336. In an alternate embodiment, the discoverable device N1 (104) may also activate the LED driver circuit 354 to the LED light array 360. Depending on the control parameter in the control field 154 of the discovery message 150, the light array 360 may be turned on, its color and illumination level adjusted, or turned off, in response.

The example discoverable lighting device N1 (104) includes a processor 322 comprising a dual central processor unit (CPU) or multi-CPU 324/325, a random access memory (RAM) 326 and read only memory (ROM) 328. The memories 326 and/or 328 include computer program code for responding to discovery messages 150 from the control server 101. Also included in the memory 307 is the server ID 311, MAC 315, network ID 313, and maximum number of hops 309.

FIG. 3A illustrates an example embodiment of the invention, showing an example of the fabrication of the discoverable lighting device N1 at a lighting device factory. The random target number array R1 (330) is written into the memory 307 of the lighting device N1 at the time of its manufacture or during installation in the lighting network 104A. The writing of the random target number array into the device, is by means of the discovery algorithm 217 generating the random target number array R1.

The discovery algorithm 217 generates the random number array "R" 214, comprising a plurality of sequentially arranged fields R(0), R(1), R(2), R(3) to R(M). Each field includes a random valued integer "i" randomly selected from a range of possible integer values. The range of possible integer values is based on the position of the field in the sequentially arranged fields of the random number array "R" 214.

Each field of the random number array "R" 214, comprises a random valued integer randomly selected from a range r(i) of possible integer values, $r(i)=\{0 \ldots 2^{(i+1)}-1\}$, the range r(i) of possible integer values based on a position i of the field in the sequentially arranged fields of the random number array "R" 214. FIG. 3A shows line 202 with the formula for the range r(i) in each of field(0), field(1), field(2), field(3), to field(M). FIG. 3A shows line 204 with the formula for the range r(i) having the field number substituted for "i" in each field, as r(0) in field(0), r(1) in field(1), r(2) in field(2), r(3) in field(0), to r(M) in field(M). FIG. 3A shows line 206 with the expression for the range r(i) in each field, as {0,1} in field(0), {0,1,2,3} in field(1), {0,1,2,3,4,5,6,7} in field(2), {0,1,2,3,4,5,6,7,8,9,10,11,12, 13,14,15} in field(3), and so on for field(M).

Values for the integers are assigned to the sequentially arranged fields R(0), R(1), R(2), R(3), and so on by randomly selecting a value from the range of values expressed in line 206. This is done with a random selector 210 and gate 212, which pass a randomly selected a value from the range of values expressed in line 206, to the corresponding field of the random number array "R" 214.

For example, in the random number array "R1" (330), values are assigned to the sequentially arranged fields of R(0)=1, R(1)=3, and R(2)=2, FIG. 3A shows the writing of the random target number array R1 (330) into the device N1 by the discovery algorithm 217, during fabrication of the discoverable lighting device N1 at the lighting device factory.

Figure 4A:
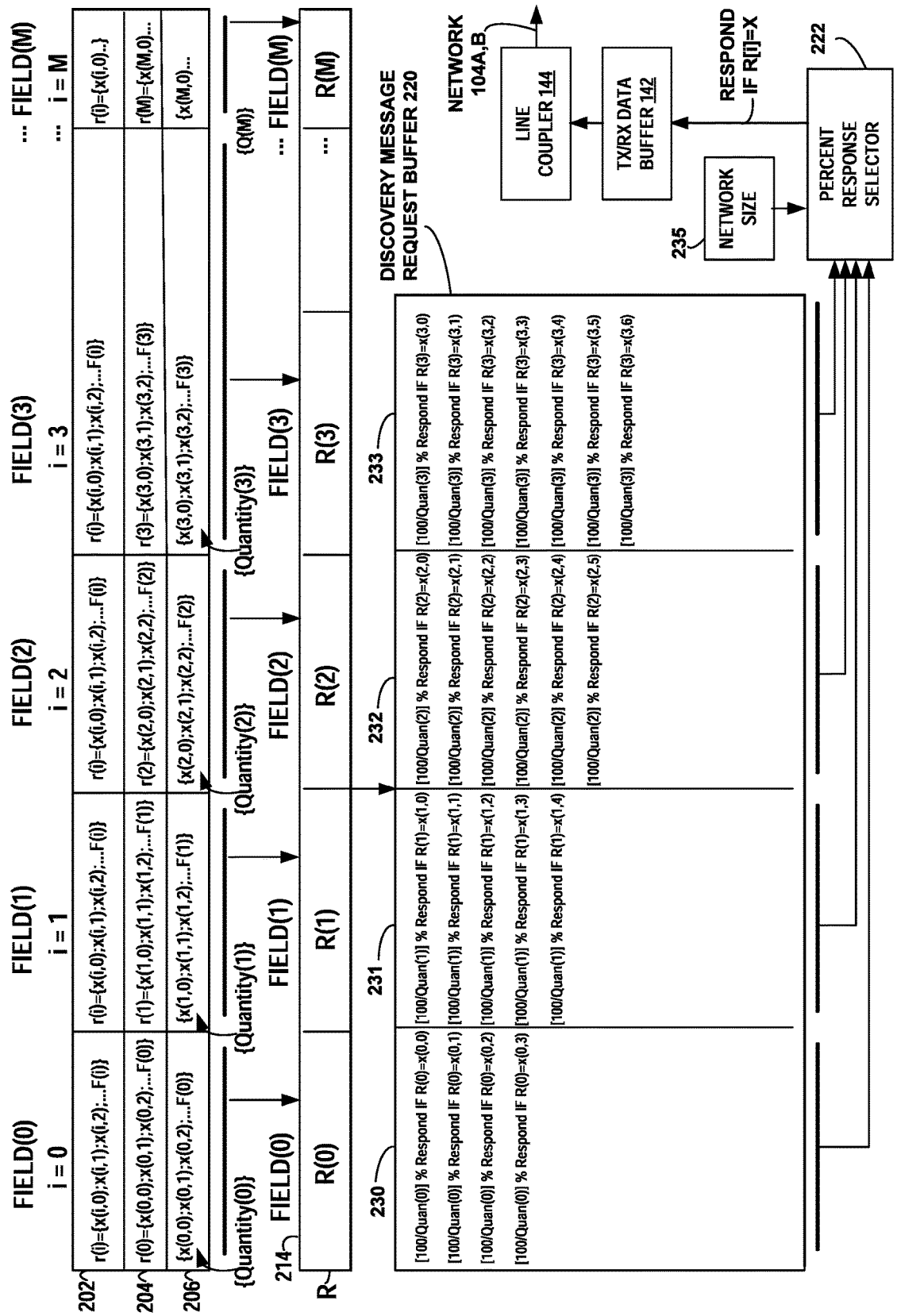
FIG. 4A illustrates an example alternate embodiment of the invention, showing a generalized discovery algorithm in the control server, which generates the request in the device discovery message. In accordance with example embodiments of the invention, the specified value in the device discovery message is an integer selected from a generalized range r(i) of possible integer values r(i)={x(i,0);x(i,1);x(i,2); . . . F(i)}, where x(i,0) is the first occurring integer element in the set r(i) and F(i) sets a maximum limit on the quantity of integers that can be elements of the set r(i). The range r(i) of possible integer values is based on a position i of a field in a linear array of sequentially arranged fields. The estimated percentage of the plurality of discoverable devices in the network expected to respond is based on the specified field in the request.

FIG. 4A illustrates an example alternate embodiment of the invention, showing a generalized discovery algorithm 217 in the control server 101, which generates the request in the device discovery message 150. In accordance with example embodiments of the invention, the specified value in the device discovery message 150 is an integer selected from a generalized range r(i) of possible integer values r(i)={x(i,0);x(i,1);x(i,2); ... F(i)}, where x(i,0) is the first occurring integer element in the set r(i) and F(i) sets a maximum limit on the quantity of integers that can be elements of the set r(i). The range r(i) of possible integer values is based on a position i of a field in a linear array of sequentially arranged fields. The estimated percentage of the plurality of discoverable devices in the network expected to respond is based on the specified field in the request.

The generalized discovery algorithm 217 generates the number array "R" 214, comprising a plurality of sequentially arranged fields R(0), R(1), R(2), R(3) to R(M). Each field includes an integer "i" selected from a range of possible integer values. The range of possible integer values is based on the position of the field in the sequentially arranged fields of the number array "R" 214.

Each field of the number array "R" 214, comprises an integer selected from a range r(i)={x(i,0);x(i,1);x(i,2); ... F(i)}, where x(i,0) is the first occurring integer element in the set r(i) and F(i) sets a maximum limit on the quantity of integers that can be elements of the set r(i). The range r(i) of possible integer values based on a position i of the field in the sequentially arranged fields of the number array "R" 214. FIG. 4A shows line 202 with the formula for the range r(i) in each of field(0), field(1), field(2), field(3), to field(M). FIG. 4A shows line 204 with the formula for the range r(i) having the field number substituted for "i" in each field, as r(0) in field(0), r(1) in field(1), r(2) in field(2), r(3) in field(0), to r(M) in field(M). FIG. 4A shows line 206 with the expression for the range r(i) in each field, as {x(0,0);x(0,1);x(0,2); ... F(0)} in field(0), {x(1,0);x(1,1);x(1,2); ... F(1)} in field(1), {x(2,0);x(2,1);x(2,2); ... F(2)} in field(2), {x(3,0);x(3,1);x(3,2); ... F(3)} in field(3), and so on for field(M).

An integer value and a field are selected by the percent response selector 222, to be specified in the request 156 in the device discovery message 150. The selection of the field is based on an estimated percentage of the plurality of discoverable devices expected to respond in the network. The network size table 235 provides the number of lighting devices in the network, to the percent response selector 222. In response, the percent response selector 222 selects the field from the discovery message request buffer 220. In this example, the estimated percentage corresponds to the quantity of integers that are possible in each field.

Figure 4B:
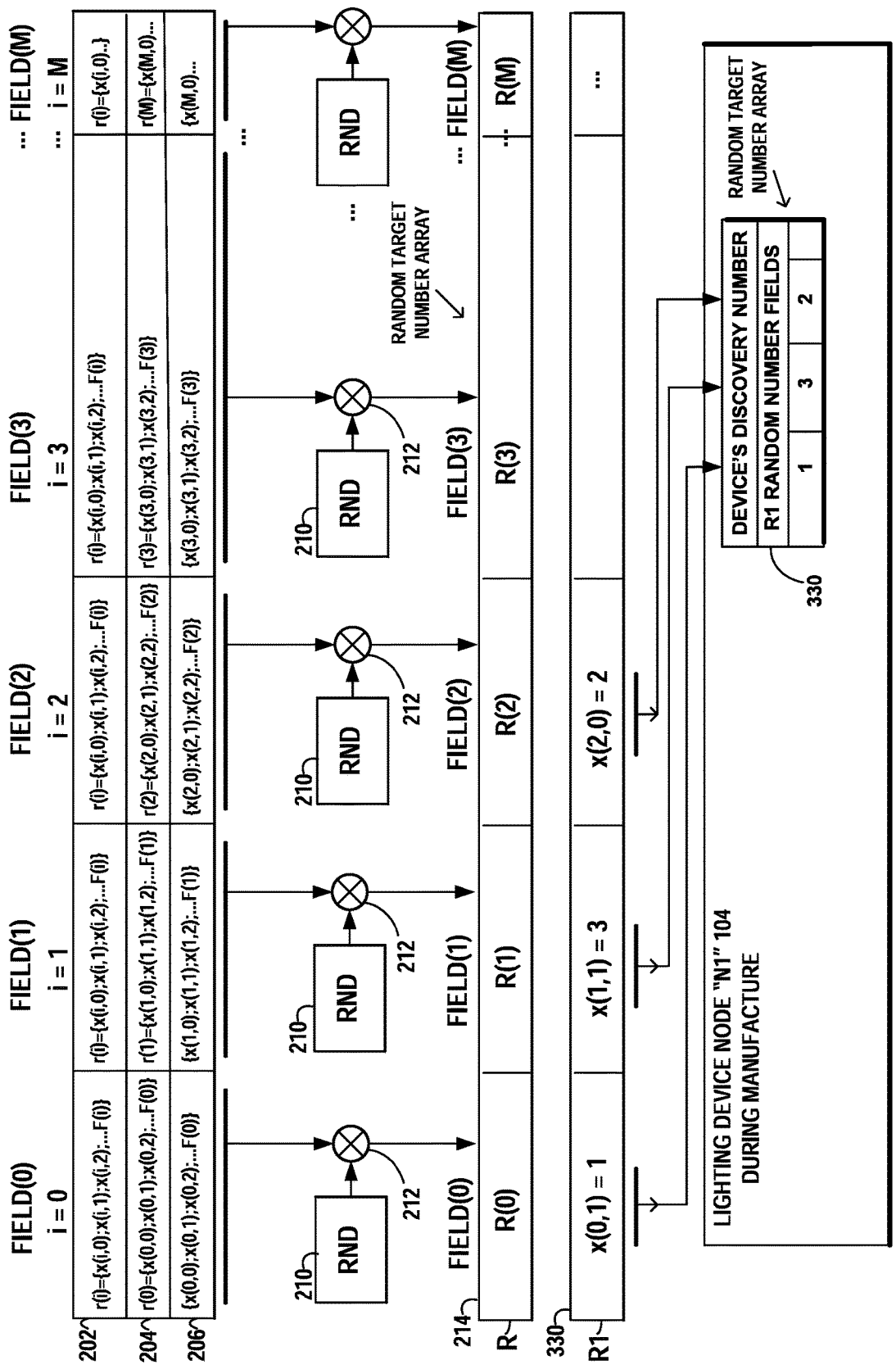
FIG. 4B illustrates an example alternate embodiment of the invention, showing an example of the fabrication of the discoverable lighting device, which includes writing the random target number array into the device, by means of the generalized discovery algorithm of FIG. 4A, applied to generate the random target number array.

FIG. 4B illustrates an example alternate embodiment of the invention, showing an example of the fabrication of the discoverable lighting device N1, which includes writing the random target number array R1 (330) into the device, by means of the generalized discovery algorithm 217 of FIG. 4A, applied to generate the random target number array. The random target number array R1 (330) is written into the memory 307 of the lighting device N1 at the time of its manufacture or during installation in the lighting network 104A.

The discovery algorithm 217 generates the random number array "R" 214, comprising a plurality of sequentially arranged fields R(0), R(1), R(2), R(3) to R(M). Each field includes a random valued integer "i" randomly selected from a range of possible integer values. The range of possible integer values is based on the position of the field in the sequentially arranged fields of the random number array "R" 214.

Each field of the number array "R" 214, comprises an integer selected from a range r(i)={x(i,0);x(i,1);x(i,2); ... F(i)}, where x(i,0) is the first occurring integer element in the set r(i) and F(i) sets a maximum limit on the quantity of integers that can be elements of the set r(i). The range r(i) of possible integer values based on a position i of the field in the sequentially arranged fields of the number array "R" 214. FIG. 4A shows line 202 with the formula for the range r(i) in each of field(0), field(1), field(2), field(3), to field(M). FIG. 4A shows line 204 with the formula for the range r(i) having the field number substituted for "i" in each field, as r(0) in field(0), r(1) in field(1), r(2) in field(2), r(3) in field(0), to r(M) in field(M). FIG. 4A shows line 206 with the expression for the range r(i) in each field, as {x(0,0);x(0,1); x(0,2); ... F(0)} in field(0), {x(1,0);x(1,1);x(1,2); ... F(1)} in field(1), {x(2,0);x(2,1);x(2,2); ... F(2)} in field(2), {x(3,0);x(3,1);x(3,2); ... F(3)} in field(3), and so on for field(M).

Values for the integers are assigned to the sequentially arranged fields R(0), R(1), R(2), R(3), and so on by randomly selecting a value from the range of values expressed in line 206. This is done with a random selector 210 and gate 212, which pass a randomly selected a value from the range of values expressed in line 206, to the corresponding field of the random number array "R" 214.

For example, in the random number array "R1" (330), values are assigned to the sequentially arranged fields of R(0)=1, R(1)=3, and R(2)=2, FIG. 4B shows the writing of the random target number array R1 (330) into the device N1 by the generalized discovery algorithm 217, during fabrication of the discoverable lighting device N1 at the lighting device factory.

Figure 5:
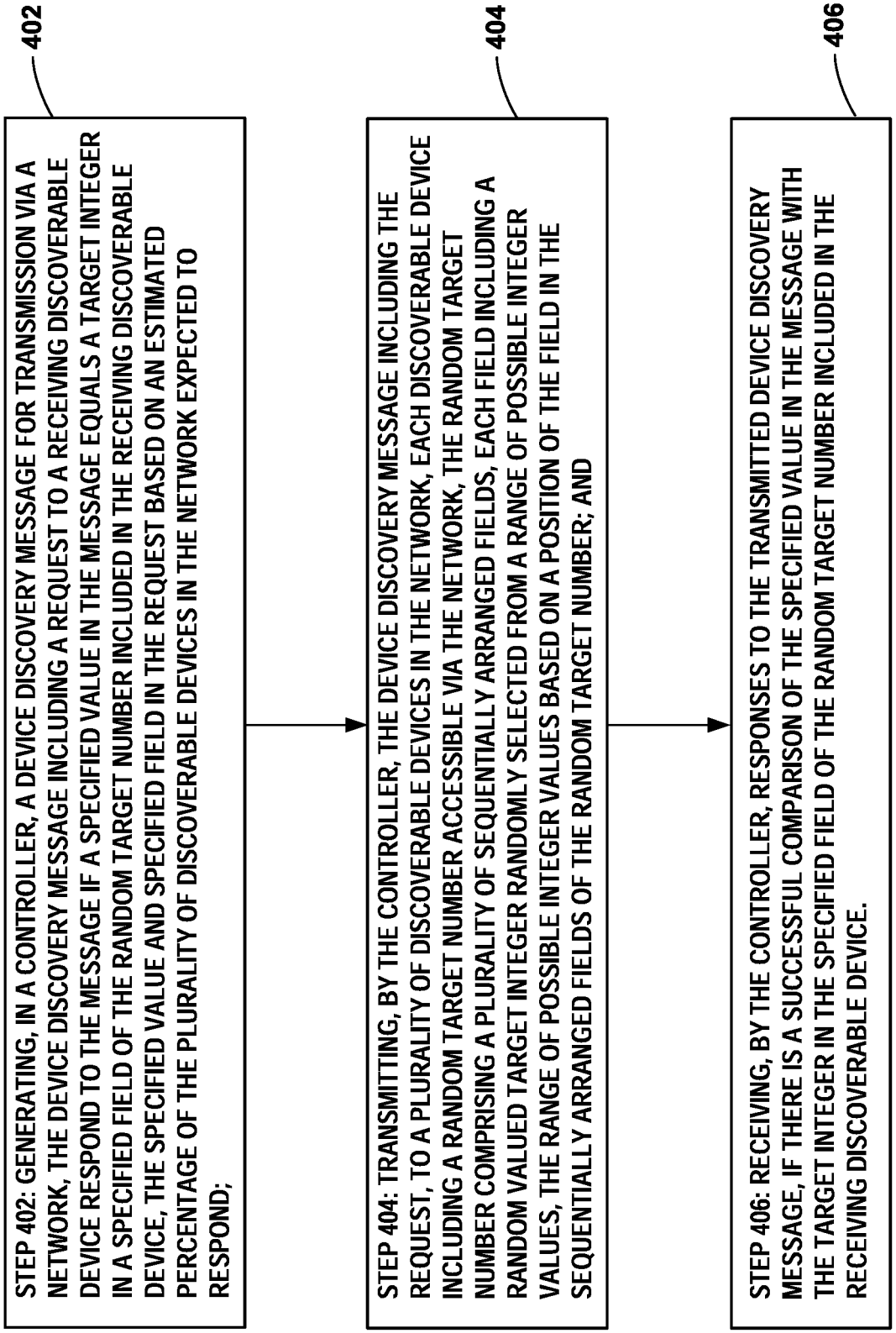
FIG. 5 illustrates an example flow diagram of steps performed by the control server in transmitting discovery messages in FIGS. 2 and 4A, wherein the device discovery message includes a request to respond to a specified value in a specified field of the target array.

FIG. 5 illustrates an example flow diagram 400 of steps performed by the control server for managing the quantity of responses by discoverable devices in a network, in responding to a device discovery request. The steps of the flow diagram 400 represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 402: generating, in a controller, a device discovery message for transmission via a network, the device discovery message including a request to a receiving discoverable device respond to the message if a specified value in the message equals a target integer in a specified field or fields of the random target number included in the receiving discoverable device, the specified value and specified field or fields in the request based on a mathematical formula or an estimated percentage of the plurality of discoverable devices in the network expected to respond;

Step 404: transmitting, by the controller, the device discovery message including the request, to a plurality of discoverable devices in the network, each discoverable device including a random target number accessible via the network, the random target number comprising a plurality of sequentially arranged fields, each field including a random valued target integer randomly selected from a range of possible integer values, the range of possible integer values based on a position of the field in the sequentially arranged fields of the random target number; and Step 406: receiving, by the controller, responses to the transmitted device discovery message, if there is a successful comparison of the specified value in the message with the target integer in the specified field of the random target number included in the receiving discoverable device.

Figure 6A:
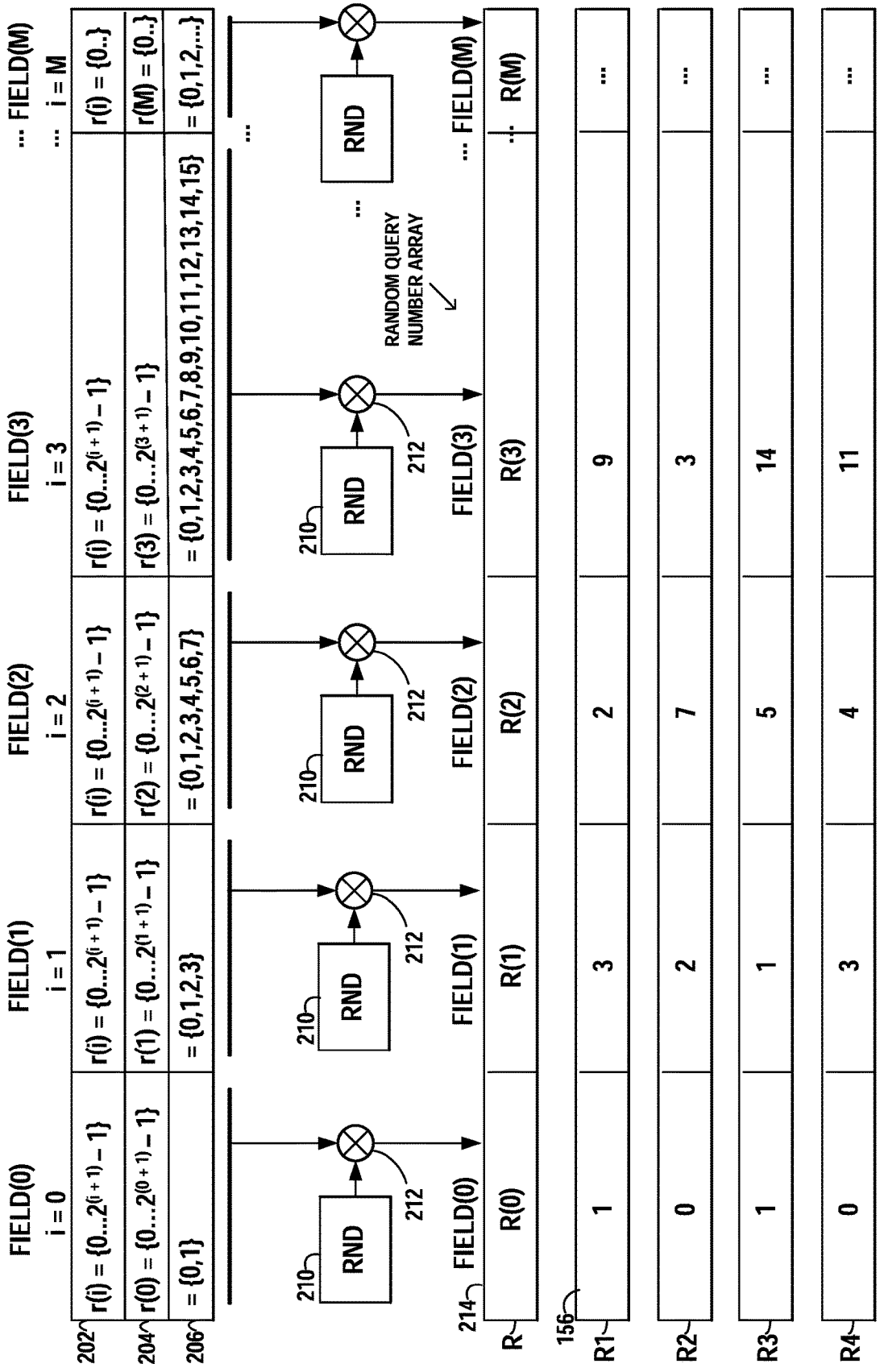
FIG. 6A illustrates an example alternate embodiment of the invention, showing the discovery algorithm in the control server, which generates a device discovery message with a random query number array comprising a plurality of sequentially arranged fields, each field including a random valued query integer randomly selected from a range of possible integer values, the range of possible integer values based on a position of the field in the sequentially arranged fields of the random query number array.

FIG. 6A illustrates an example alternate embodiment of the invention, showing the discovery algorithm in the control server, which generates a device discovery message with a random query number array comprising a plurality of sequentially arranged fields, each field including a random valued query integer randomly selected from a range of possible integer values, the range of possible integer values based on a position of the field in the sequentially arranged fields of the random query number array.

The discovery algorithm 217 generates the random query number array "R" 214, comprising a plurality of sequentially arranged fields R(0), R(1), R(2), R(3) to R(M). Each field includes a random valued query integer "i" randomly selected from a range of possible integer values. The range of possible integer values is based on the position of the field in the sequentially arranged fields of the random query number array "R" 214.

Each field of the random query number array "R" 214, comprises a random valued query integer randomly selected from a range r(i) of possible integer values, $r(i)=\{0 \ldots 2^{(i+1)}-1\}$, the range r(i) of possible integer values based on a position i of the field in the sequentially arranged fields of the random query number array "R" 214. FIG. 6A shows line 202 with the formula for the range r(i) in each of field(0), field(1), field(2), field(3), to field(M). FIG. 6A shows line 204 with the formula for the range r(i) having the field number substituted for "i" in each field, as r(0) in field(0), r(1) in field(1), r(2) in field(2), r(3) in field(0), to r(M) in field(M). FIG. 6A shows line 206 with the expression for the range r(i) in each field, as $\{0,1\}$ in field(0), $\{0,1,2,3\}$ in field(1), $\{0,1,2,3,4,5,6,7\}$ in field(2), $\{0,1,2,3,4,5,6,7,8,9,10,11,12,13,14,15\}$ in field(3), and so on for field(M).

Values for the integers are assigned to the sequentially arranged fields R(0), R(1), R(2), R(3), and so on by randomly selecting a value from the range of values expressed in line 206. This is done with a random selector 210 and gate 212, which pass a randomly selected a value from the range of values expressed in line 206, to the corresponding field of the random query number array "R" 214, as shown in FIG. 6A.

For example, in the random query number array "R1" (156), values are assigned to the sequentially arranged fields of R(0)=1, R(1)=3, and R(2)=2, as shown in FIG. 6A. The control server then formats the discovery message 150 to include the random number array R1, as shown in FIG. 1A.

The discovery algorithm 217 in the control server 101 is shown in FIG. 6A, sequentially generating random number arrays R1, R2, R3, and R4. R1 is the array (1,3,2,9); R2 is the array (0,2,7,3); R3 is the array (1,1,5,14); and R4 is the array (0,3,4,11).

FIG. 6B illustrates an example alternate embodiment of the invention, showing an example of the fabrication of the discoverable lighting device, which includes writing the random target number array into the device, by means of the discovery algorithm of FIG. 6A, applied to generate the random target number array. The random target number array comprises a plurality of sequentially arranged fields, each field including a random valued target integer randomly selected from a range of possible integer values, the range of possible integer values based on a position of the field in the sequentially arranged fields of the random target number array.

The random target number array R1 (330) is written into the memory 307 of the lighting device N1 at the time of its manufacture or during installation in the lighting network 104A. The writing of the random target number array into the device, is by means of the discovery algorithm 217 generating the random target number array R1. The generation of the random target number array R1 (330) by the discovery algorithm 217, is the same process that was described above for the generation of the random query number array "R1" (156) in FIG. 2. FIG. 6B shows the writing of the random target number array R1 (330) into the device N1 by the discovery algorithm 217, during fabrication of the discoverable lighting device N1 at the lighting device factory.

FIG. 7 illustrates an example flow diagram 700 of steps performed by the control server for reducing a quantity of responses by discoverable devices in a network, in responding to a device discovery request. The steps of the flow diagram 700 represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 702: generating, in a controller, a device discovery message for transmission via a network, the device discovery message including a random query number comprising a plurality of sequentially arranged fields, each field including a random valued query integer randomly selected from a range of possible integer values, the range of possible integer values based on a position of the field in the sequentially arranged fields of the random query number;

Step 704: transmitting, by the controller, the device discovery message including the random query number, to a plurality of discoverable devices in the network, each discoverable device including a random target number accessible via the network, the random target number comprising a plurality of sequentially arranged fields, each field including a random valued target integer randomly selected from a range of possible integer values, the range of possible integer values based on a position of the field in the sequentially arranged fields of the random target number; and Step 706: receiving, by the controller, responses to the transmitted device discovery message, if there is a successful comparison at any of the discoverable devices, of the one or more of the random valued query integer in one or more respective fields of the received random query number, with the corresponding respective random valued target integer in one or more respective fields of the receiving discoverable device's random target number.

Although specific example embodiments of the invention have been disclosed, persons of skill in the art will appreciate that changes may be made to the details described for the specific example embodiments, without departing from the spirit and the scope of the invention.

What is claimed is:

1. A method for reducing a quantity of responses in a network, in responding to a device discovery request, comprising:

storing in a discoverable device, a random target number array accessible via a network, the random target number array comprising a plurality of sequentially arranged fields, each field including a random valued target integer randomly selected from a range of possible integer values, the range of possible integer values in a field based on a position of the field in the sequentially arranged fields of the random target number array;

receiving in the discoverable device, a device discovery message including a request to a receiving discoverable device to respond to the message if a specified integer value in a specified field in the message equals a target integer in a corresponding field of the random target number array included in the receiving discoverable device, the specified value and specified field in the request being based on an estimated percentage of the plurality of discoverable devices in the network expected to respond; and generating by the discoverable device, a response to the received device discovery message, if the specified integer value in the specified field in the message equals the target integer in the corresponding field of the random target number array included in the receiving discoverable device.

2. The method of claim 1, wherein the discoverable device is fabricated with the random target number either during manufacture or during installation in the network.

3. The method of claim 1, wherein the specified value in the message is equal to the target integer.

4. The method of claim 1, wherein each field of the random target number comprises a random valued target integer randomly selected from a range r(i) of possible integer values, $$r(i)=\{x(i,0);x(i,1);x(i,2); \ldots F(i)\},$$

where x(i,0) is the first occurring integer element in the set r(i) and F(i) sets a maximum limit on the quantity of integers that can be elements of the set r(i) and the range r(i) of possible integer values is based on a position i of the field in the sequentially arranged fields of the random target number.

5. The method of claim 1, wherein the specified value in the device discovery message is an integer selected from a generalized range r(i) of possible integer values $$r(i)=\{x(i,0);x(i,1);x(i,2); \ldots F(i)\},$$

where x(i,0) is the first occurring integer element in the set r(i) and F(i) sets a maximum limit on the quantity of integers that can be elements of the set r(i), the range r(i) of possible integer values is based on a position i of a field in a linear array of sequentially arranged fields, and the estimated percentage of the plurality of discoverable devices in the network expected to respond is based on the specified field in the request.

6. A method for reducing a quantity of responses by discoverable devices in a network, in responding to a device discovery request, comprising:

generating, in a controller, a device discovery message for transmission via a network, the device discovery message including a request to a receiving discoverable device to respond to the message if a specified integer value in a specified field in the message equals a target integer in a corresponding field of a random target number array included in the receiving discoverable device, the specified value and specified field in the request being based on an estimated percentage of the plurality of discoverable devices in the network expected to respond;

transmitting, by the controller, the device discovery message including the request, to a plurality of discoverable devices in the network, each discoverable device including a random target number array accessible via the network, the random target number array comprising a plurality of sequentially arranged fields, each field including a random valued target integer randomly selected from a range of possible integer values, the range of possible integer values in a field based on a position of the field in the sequentially arranged fields of the random target number array; and receiving, by the controller, responses to the transmitted device discovery message, if the specified integer value in the specified field in the message equals the target integer in the corresponding field of the random target number array included in the receiving discoverable device.

7. The method of claim 6, wherein device discovery is conducted in two stages, a first stage wherein responses are obtained from all of the discoverable devices receiving the device discovery message, followed by a second stage wherein each discoverable device receiving the device discovery message responds to the received device discovery message, if there is a successful comparison of the specified value in the message with the target integer in the specified field of the random target number included in the receiving discoverable device.

8. The method of claim 6, wherein the specified value in the message is equal to the target integer.

9. The method of claim 6, wherein each field of the random target number comprises a random valued target integer randomly selected from a range r(i) of possible integer values, $$r(i)=\{x(i,0);x(i,1);x(i,2); \ldots F(i)\},$$

where x(i,0) is the first occurring integer element in the set r(i) and F(i) sets a maximum limit on the quantity of integers that can be elements of the set r(i) and the range r(i) of possible integer values is based on a position i of the field in the sequentially arranged fields of the random target number.

10. The method of claim 6, wherein the specified value in the device discovery message is an integer selected from a generalized range r(i) of possible integer values $$r(i)=\{x(i,0);x(i,1);x(i,2); \ldots F(i)\},$$

where x(i,0) is the first occurring integer element in the set r(i) and F(i) sets a maximum limit on the quantity of integers that can be elements of the set r(i), the range r(i) of possible integer values is based on a position i of a field in a linear array of sequentially arranged fields, and the estimated percentage of the plurality of discoverable devices in the network expected to respond is based on the specified field in the request.

11. A method for reducing a quantity of responses in a network, in responding to a device discovery request, comprising:

storing in a discoverable device, a random target number array accessible via a network, the random target number array comprising a plurality of sequentially arranged fields, each field including a random valued target integer randomly selected from a range of possible integer values in a field, the range of possible integer values based on a position of the field in the sequentially arranged fields of the random target number array;

receiving in the discoverable device, a device discovery message including a request to a receiving discoverable device to respond to the message if a specified integer value in a specified field in the message equals a target integer in a corresponding field of the random target number array included in the receiving discoverable device, the specified value and specified field in the request being based on an estimated percentage of the plurality of discoverable devices in the network expected to respond; and generating by the discoverable device, a response to the received device discovery message, if the specified integer value in the specified field in the message equals the target integer in the corresponding field of the random target number array included in the receiving discoverable device.

12. The method of claim 11, wherein the discoverable device is fabricated with the random target number either during manufacture or during installation in the network.

13. The method of claim 11, wherein the specified value in the message is equal to the target integer.

14. The method of claim 11, wherein each field of the random target number comprises a random valued target integer randomly selected from a range r(i) of possible integer values, $$r(i)=\{x(i,0); x(i,1); x(i,2); \ldots F(i)\},$$

where x(i,0) is the first occurring integer element in the set r(i) and F(i) sets a maximum limit on the quantity of integers that can be elements of the set r(i) and the range r(i) of possible integer values is based on a position i of the field in the sequentially arranged fields of the random target number.

15. The method of claim 11, wherein the specified value in the device discovery message is an integer selected from a generalized range r(i) of possible integer values $$r(i)=\{x(i,0); x(i,1); x(i,2); \ldots F(i)\},$$

where x(i,0) is the first occurring integer element in the set r(i) and F(i) sets a maximum limit on the quantity of integers that can be elements of the set r(i), the range r(i) of possible integer values is based on a position i of a field in a linear array of sequentially arranged fields, and the estimated percentage of the plurality of discoverable devices in the network expected to respond is based on the specified field in the request.

16. A method for reducing a quantity of responses by discoverable devices in a network, in responding to a device discovery request, comprising:

generating, in a controller, a device discovery message for transmission via a network, the device discovery message including a request to a receiving discoverable device to respond to the message if a specified integer value in a specified field in the message equals a target integer in a corresponding field of a random target number array included in the receiving discoverable device, the specified value and specified field in the request being based on an estimated percentage of the plurality of discoverable devices in the network expected to respond;

transmitting, by the controller, the device discovery message including the request, to a plurality of discoverable devices in the network, each discoverable device including a random target number array accessible via the network, the random target number array comprising a plurality of sequentially arranged fields, each field including a random valued target integer randomly selected from a range of possible integer values, the range of possible integer values in a field based on a position of the field in the sequentially arranged fields of the random target number array; and receiving, by the controller, responses to the transmitted device discovery message, if the specified integer value in the specified field in the message equals with the target integer in the corresponding field of the random target number array included in the receiving discoverable device.

17. The method of claim 16, wherein the discoverable device is fabricated with the random target number either during manufacture or during installation in the network.

18. The method of claim 16, wherein the specified value in the message is equal to the target integer.

19. The method of claim 16, wherein each field of the random target number comprises a random valued target integer randomly selected from a range r(i) of possible integer values, $$r(i)=\{x(i,0); x(i,1); x(i,2); \ldots F(i)\},$$

where x(i,0) is the first occurring integer element in the set r(i) and F(i) sets a maximum limit on the quantity of integers that can be elements of the set r(i) and the range r(i) of possible integer values is based on a position i of the field in the sequentially arranged fields of the random target number.

20. The method of claim 16, wherein the specified value in the device discovery message is an integer selected from a generalized range r(i) of possible integer values $$r(i)=\{x(i,0); x(i,1); x(i,2); \ldots F(i)\},$$

where x(i,0) is the first occurring integer element in the set r(i) and F(i) sets a maximum limit on the quantity of integers that can be elements of the set r(i), the range r(i) of possible integer values is based on a position i of a field in a linear array of sequentially arranged fields, and the estimated percentage of the plurality of discoverable devices in the network expected to respond is based on the specified field in the request.

* * * * *